`US007493332B2`

(12) United States Patent
Rahman

(10) Patent No.: US 7,493,332 B2
(45) Date of Patent: Feb. 17, 2009

(54) STORING LOCALLY A FILE RECEIVED FROM A REMOTE LOCATION

(75) Inventor: Tanvir Rahman, Mountlake Terrace, WA (US)

(73) Assignee: Microsoft Corporation, Redmond, WA (US)

(*) Notice: Subject to any disclaimer, the term of this patent is extended or adjusted under 35 U.S.C. 154(b) by 176 days.

(21) Appl. No.: 10/982,314

(22) Filed: Nov. 4, 2004

(65) Prior Publication Data

US 2005/0060352 A1 Mar. 17, 2005

Related U.S. Application Data

(62) Division of application No. 09/631,854, filed on Aug. 3, 2000, now Pat. No. 6,832,220.

(51) Int. Cl.
*G06F 7/00* (2006.01)
*G06F 17/30* (2006.01)
*G06F 17/00* (2006.01)
*G06F 3/00* (2006.01)

(52) U.S. Cl. ............................ 707/102; 707/3; 715/730
(58) Field of Classification Search .................. 707/5, 707/3, 10, 102; 709/217; 715/730
See application file for complete search history.

(56) References Cited

U.S. PATENT DOCUMENTS

| | | | |
|---|---|---|---|
| 5,695,742 A * | 12/1997 | Felder et al. | 424/9.455 |
| 5,758,297 A | 5/1998 | Gaultier | |
| 5,850,386 A | 12/1998 | Anderson et al. | |
| 5,864,846 A * | 1/1999 | Voorhees et al. | 707/5 |
| 5,960,429 A | 9/1999 | Peercy et al. | |
| 5,974,455 A | 10/1999 | Monier | |
| 6,078,917 A | 6/2000 | Paulsen, Jr. et al. | |
| 6,128,620 A | 10/2000 | Pissanos et al. | |
| 6,148,304 A | 11/2000 | de Vries et al. | |
| 6,182,065 B1 | 1/2001 | Yeomans | |
| 6,195,707 B1 | 2/2001 | Minh | |
| 6,211,874 B1 | 4/2001 | Himmel et al. | |
| 6,222,634 B1 | 4/2001 | Dubbels et al. | |
| 6,223,178 B1 | 4/2001 | Himmel et al. | |
| 6,226,655 B1 | 5/2001 | Borman et al. | |
| 6,229,535 B1 | 5/2001 | Tokuda | |
| 6,253,198 B1 | 6/2001 | Perkins | |
| 6,256,620 B1 * | 7/2001 | Jawahar et al. | 707/2 |
| 6,256,627 B1 | 7/2001 | Beattie et al. | |
| 6,256,643 B1 | 7/2001 | Cork et al. | |
| 6,271,840 B1 * | 8/2001 | Finseth et al. | 715/236 |
| 6,278,993 B1 | 8/2001 | Kumar et al. | |
| 6,281,986 B1 | 8/2001 | Form | |
| 6,308,179 B1 | 10/2001 | Petersen et al. | |
| 6,339,767 B1 * | 1/2002 | Rivette et al. | 707/2 |
| 6,366,923 B1 | 4/2002 | Lenk et al. | |
| 6,381,637 B1 | 4/2002 | Kamada | |

(Continued)

OTHER PUBLICATIONS

Masum, ZH et al. "Visual Web Surfing with Hy+" 1995, pp. 1-10.

(Continued)

*Primary Examiner*—Hosain T Alam
*Assistant Examiner*—Shew-Fen Lin

(57) ABSTRACT

Systems and/or methods for storing locally a file received from a remote location corresponding to a file indicator and/or after waiting until an amount of time corresponding to a delay value has lapsed are disclosed.

8 Claims, 9 Drawing Sheets

U.S. PATENT DOCUMENTS

| | | |
|---|---|---|
| 6,397,218 B1 | 5/2002 | Stern et al. |
| 6,401,077 B1 | 6/2002 | Godden et al. |
| 6,401,118 B1 * | 6/2002 | Thomas ............... 709/224 |
| 6,434,556 B1 * | 8/2002 | Levin et al. ............... 707/5 |
| 6,564,217 B2 | 5/2003 | Bunney et al. |
| 6,643,694 B1 | 11/2003 | Chernin |
| 6,662,230 B1 | 12/2003 | Eichstaedt et al. |
| 6,665,659 B1 | 12/2003 | Logan |
| 6,667,751 B1 | 12/2003 | Wynn et al. |
| 6,832,220 B1 | 12/2004 | Rahman |
| 6,999,959 B1 | 2/2006 | Lawrence et al. |
| 7,010,537 B2 * | 3/2006 | Eyal et al. ............. 707/100 |
| 7,047,489 B2 * | 5/2006 | Kanno et al. ........... 715/277 |
| 7,058,624 B2 | 6/2006 | Masters |
| 7,072,746 B1 | 7/2006 | Burch |
| 7,088,798 B2 | 8/2006 | Chen et al. |
| 7,095,426 B1 * | 8/2006 | Childress ............... 715/794 |
| 7,127,670 B2 | 10/2006 | Bendik |
| 7,210,093 B1 * | 4/2007 | Dutta ............... 715/210 |
| 7,290,204 B1 * | 10/2007 | Kanno et al. ........... 715/205 |
| 2001/0020238 A1 | 9/2001 | Tsuda |
| 2002/0078143 A1 | 6/2002 | De Boor et al. |
| 2002/0143933 A1 | 10/2002 | Hind et al. |
| 2002/0184337 A1 | 12/2002 | Hyldahl |
| 2003/0131048 A1 | 7/2003 | Najork |

OTHER PUBLICATIONS

"Merriam Webster's Collegiate Dictionary," Tenth Edition, Copyright 1996, title pages & pp. 55-56.

Da Silva, A. S., et al., "CoBWeb-a crawler for the Brazilian Web", *String Processing and Information Retrieval Symposium,* International Workshop on Groupware, (1999), 184-191.

Eichmann, David "Ethical Web Agents", *Computer Networks and ISDN Systems* vol. 28 *Issues 1-2, Selected Papers from the Second World-Wide Web Conference,* Dec. 1995, 127-136.

* cited by examiner 140         142

| | |
|---|---|
| 1000 | Click on an item from the Table of Contents |
| 1001 | |
| 1002 | |
| 1003 | |
| 1004 | |
| 4112 | |
| 4112a | |
| test1 | |
| test alpha | |
| news108 | |
| breaking news | |

Fig. 3

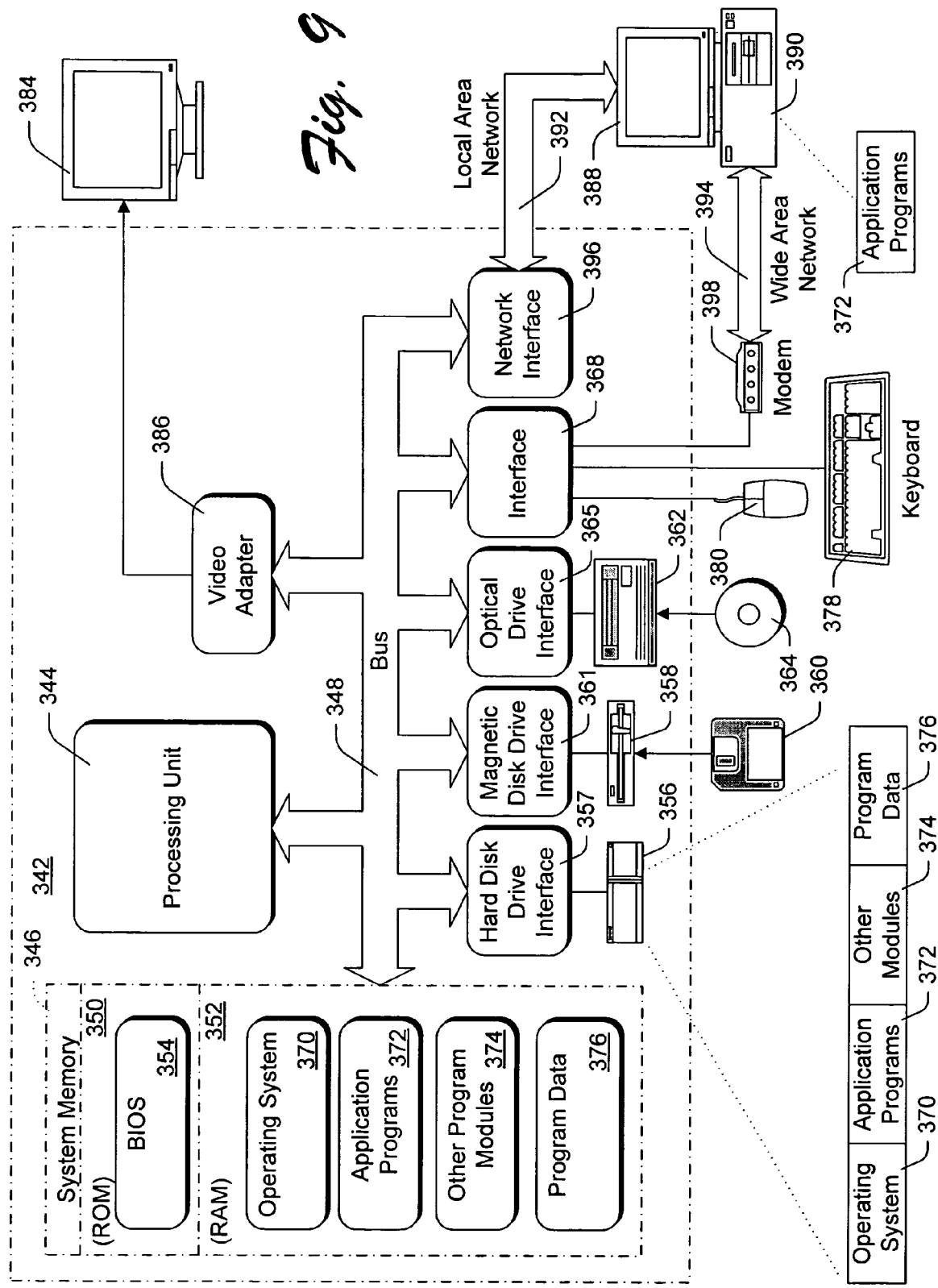

STORING LOCALLY A FILE RECEIVED FROM A REMOTE LOCATION

CROSS REFERENCE TO RELATED PATENT APPLICATION

This is a divisional of and priority is claimed to co-pending United States patent application having Ser. No. 09/631,854 and a filing date of Aug. 3, 2000, for METHOD AND APPARATUS FOR FILE SEARCHING, ACCESSING FILE IDENTIFIERS FROM REFERENCE PAGE (as amended) of Rahman. This co-pending United States patent application is commonly assigned herewith and is hereby incorporated herein by reference for all that it discloses.

TECHNICAL FIELD

This invention relates to storing locally a file received from a remote location.

BACKGROUND OF THE INVENTION

Nowadays, a great many computers can communicate with one another over networks. One such network is the Internet, the use of which has expanded greatly in recent years (and is expected to continue). One significant way in which the Internet is used is the World Wide Web (also referred to as the "web"), which is a collection of documents (referred to as simply "web pages") that users can view or otherwise render and which typically include links to one or more other pages that the user can access. These web documents are typically stored as one or more files at a remote location, being accessed by a user via his or her computer and the Internet.

Web pages are accessed for a wide variety of different reasons. By way of example, web pages may be accessed to test a web browser (an application program that manages the rendering of web pages to a user). By way of another example, web pages may be accessed by a user to view information he or she is interested in (e.g., an audio and/or video program, information describing products or services that a company offers, etc.).

Unfortunately, the selection and loading of web pages is currently a largely manual process. For example, selection of a set of web pages that are to be used to test a web browser is performed by a user manually typing in the paths and names of each web page in the test set. These web page identifiers are then individually selected by the user to access the identified page (causing the web browser to load the page and thereby test proper operation of the browser). By way of another example, a web search engine may identify multiple web pages that match a set of search criteria, but the user is then required to access each of the resulting web pages manually. Such manual processes, however, can be tedious and time-consuming on the part of the user, as well as error-prone.

The invention described below addresses these disadvantages, providing automatic file searching and accessing.

SUMMARY OF THE INVENTION

Systems and/or methods for storing locally a file received from a remote location corresponding to a file indicator and/or after waiting until an amount of time corresponding to a delay value has lapsed are disclosed.

BRIEF DESCRIPTION OF THE DRAWINGS

The present invention is illustrated by way of example and not limitation in the figures of the accompanying drawings. The same numbers are used throughout the figures to reference like components and/or features.

FIG. 3 illustrates an exemplary display of a reference page in accordance with certain embodiments of the invention.

FIG. 9 illustrates an example of a suitable operating environment in which the invention may be implemented.

DETAILED DESCRIPTION

Figure 1:
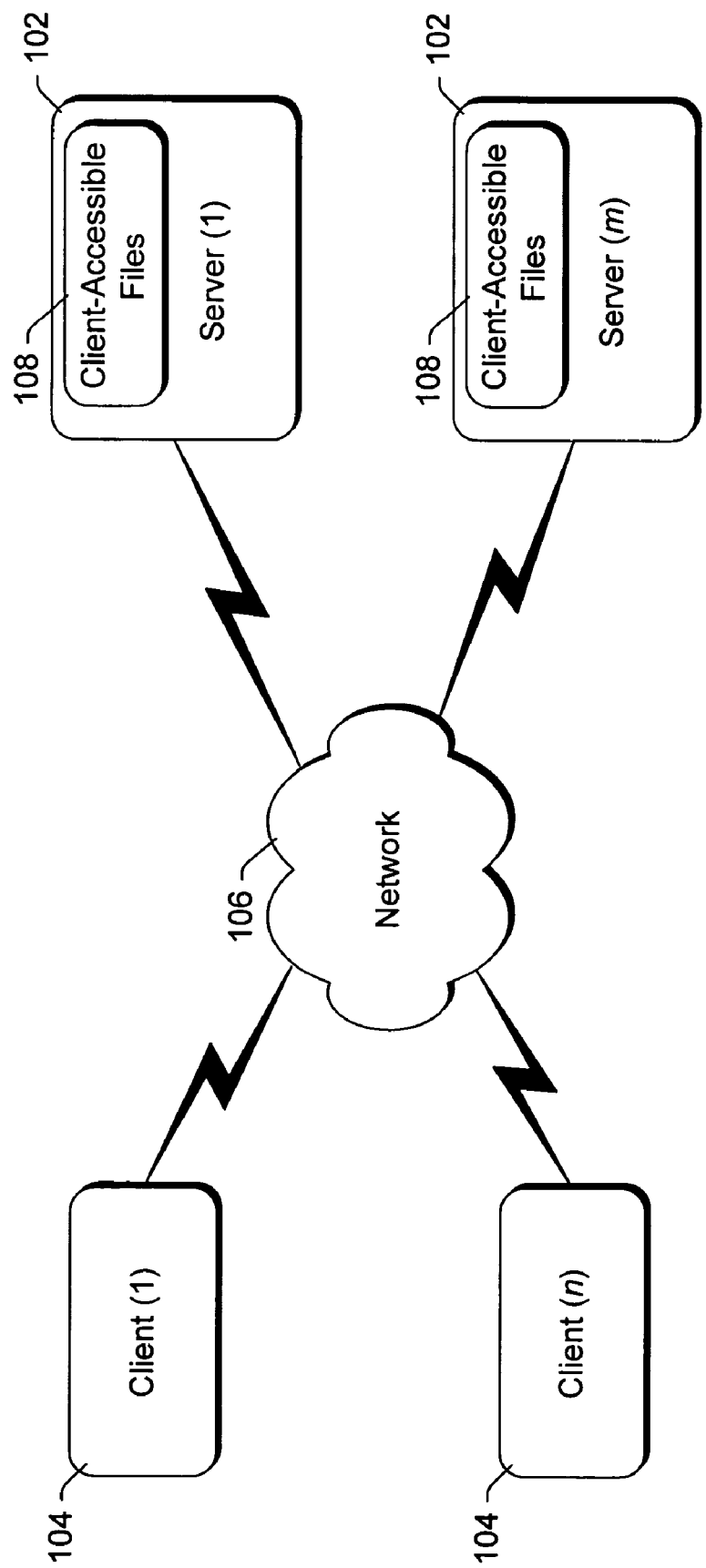
FIG. 1 shows a client/server network system and environment in accordance with certain embodiments of the invention.

FIG. 1 shows a client/server network system and environment in accordance with certain embodiments of the invention. Generally, the system includes multiple (m) network server computers 102, and multiple (n) network client computers 104. The computers 102 and 104 communicate with each other over a data communications network 106. The communications network 106 can be, for example, a private network, a public network (such as the Internet), and might also include local-area networks and/or private wide-area networks.

Servers 102 store various information, typically as one or more files 108 that are accessible to clients 104 via network 106. Files 108 can be accessed in accordance with any of a variety of protocols, such as the Hypertext Transfer Protocol (HTTP). One way in which the network 106 can be used is to support the World Wide Web (or simply the "web"), and in certain embodiments, files 108 are conventional web pages.

Client 104 allows users (and/or other applications) to search for files that satisfy a set of search criteria locally at the client 104 and/or remotely at a server 102 (e.g., client-accessible files 108). The client 104 generates a reference page that includes identifiers of those files that satisfy the search criteria. Additionally, client 104 can also automatically access the files corresponding to the identifiers on the reference page (or identifiers obtained elsewhere) to allow viewing of the files, local storing of the files, etc. This automatic file searching and accessing is discussed in more detail below.

Figure 2:
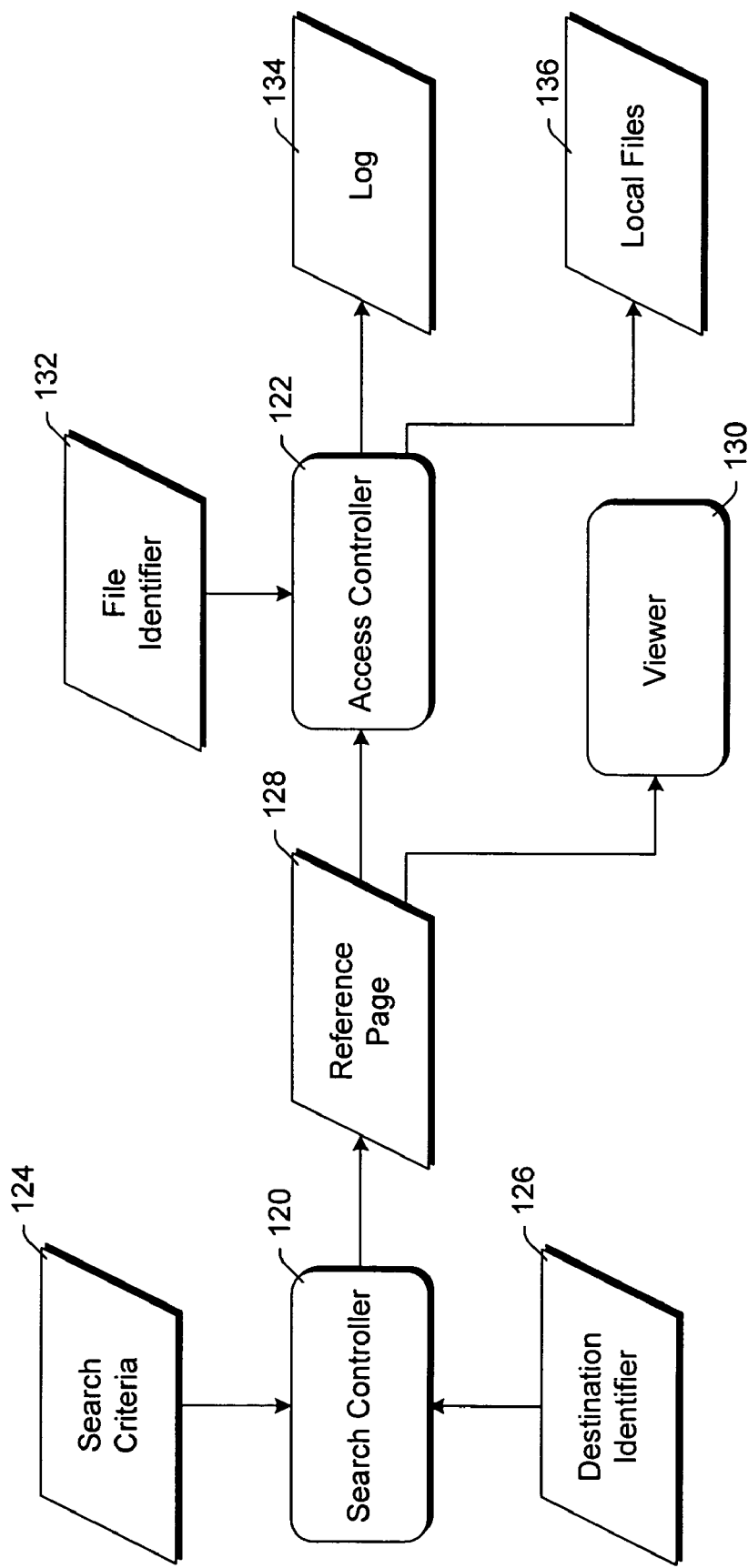
FIG. 2 is a block diagram illustrating an exemplary data flow for automatic file searching and accessing in accordance with certain embodiments of the invention.

FIG. 2 is a block diagram illustrating an exemplary data flow for automatic file searching and accessing in accordance with certain embodiments of the invention. The automatic file searching and accessing illustrated in FIG. 2 is carried out by a search controller 120 and an access controller 122 (e.g., on a client computer 104 of FIG. 1). Controllers 120 and 122 may be implemented in any combination of one or more of software, firmware, hardware, etc. For example, controllers 120 and 122 may be implemented as software (e.g., one or more scripts) executing on a web page, in a programmable logic device (PLD), etc.

Search controller 120 receives as inputs search criteria 124 and destination identifier 126. Search criteria 124 is made up of one or more search parameters that are identified by a user, or alternatively by another application program. Any of a wide variety of search parameters can be used, and can include global variables (e.g., the use of an asterisk to indicate multiple characters, the use of a question mark to indicate a single character, etc.). Particular file names can be searched for (such as files with certain extensions (e.g., "*.asp" or "*.htm"), as well as other file characteristics (e.g., creation date and/or time, last modification date and/or time, file size, etc.).

Destination identifier 126 is an identifier of one or more destinations that are to be searched. These destinations can be local (e.g., at the same client 104 of FIG. 1 that is performing the searching) or remote (e.g., at one of servers 102). The destinations can be identified in any of a wide variety of manners, such as typical directory or folder paths (e.g., "C:\Work\Reference Documents"), Universal Naming Convention (UNC) paths (e.g., \\server1\documents), etc.

Given the search criteria 124 and the destination identifier 126, search controller 120 accesses the identified destination and compares the files to the search criteria 124. File identifiers of any of the files that satisfy the search criteria (e.g., the files having characteristics that match the search parameters) are stored to a reference page 128 (which itself may be a web page). This storage may be automatic, or alternatively the storage may be in response to a user input (e.g., allowing the user an opportunity to verify that he or she wants to store the pages). Alternatively, no search criteria 124 may be used and file identifiers for all files at the destination may be added to reference page 128. In the illustrated example, reference page 128 includes the file identifiers of all the files at the destination that satisfy the search criteria.

Search controller 120 also allows the user to make modifications to the file identifiers on reference page 128. In one implementation, these modifications take the form of additional parameters added to the file identifiers. For example, certain web pages, when accessed, can be passed parameters (e.g., search parameters, identifying information regarding the calling computer, etc.). A user can manually add such parameters to a file identifier on reference page 128, allowing such parameters to be included when the web page is subsequently accessed (as discussed in more detail below).

The file identifiers are included on reference page 128 in a manner that allows the corresponding files to be subsequently accessed by selection of the identifier from page 128. In one implementation, the file identifiers are stored as uniform resource locators (URLs) of the files. The URLs are generated by "wrapping" the file names in html syntax (e.g., <a href="filename.htm">filetitle</a> for the file identifier filename.htm).

Selection of identifiers on reference page 128 can be performed manually or automatically. Automatic selection of the file identifiers is carried out by access controller 122, discussed in more detail below. Manual selection of the file identifiers is supported by a viewer 130. Viewer 130 can be, for example, a conventional web browser. Reference page 128 can be a conventional markup language document (e.g., HTML (Hypertext Markup Language), XML (eXtensible Markup Language), etc.) that is readable by viewer 130. The file identifiers are displayed as user-selectable links, and user-selection of one of the links causes viewer 130 to load the corresponding file.

Additionally, reference page 128 can be input to access controller 122 as a source list of file identifiers. Alternatively, file identifiers 132 may be provided to access controller 122 in place of (or in addition to) the identifiers from page 128. File identifiers 132 can be input to controller 122 in any of a variety of manners, such as manual input by a user, another file including a listing of identifiers, a web page generated by another program (e.g., the results of an on-line Internet search engine), etc.

Access controller 122 then accesses the files corresponding to the file identifiers it receives. In one implementation, where the file identifiers are URLs, the URLs are used to identify the proper location (e.g., an Internet address) where the corresponding file can be obtained, as well as the file name. Access controller 122 generates a log 134 to maintain a record of the files that it accesses. Log 134 includes, for example, the file identifier and the time that the file was accessed.

Accessing of the files by access controller 122 may further include additional functions. For example, for web pages (or other displayable files), the file contents can be displayed to the user in a window of a display device at client 104 of FIG. 1. By way of another example, access controller 122 can copy the files and store them locally as local files 136. Such locally stored files 136 can then be subsequently accessed by a user (e.g., when he or she is not in communication with the Internet, or after the remote server has deleted its copy of a file).

FIG. 3 illustrates an exemplary display of a reference page 128 in accordance with certain embodiments of the invention. An identifier portion 140 of the displayed page 128 includes the multiple selectable file identifiers (additional identifiers can be displayed, such as by use of a conventional scroll bar(s)). A user is optionally able to add parameters to the file identifiers by, for example, situating a cursor at the desired location (e.g., using a cursor control device such as a mouse) and typing in the desired parameter(s) via a keyboard. A user is further able to select one of the identifiers in portion 140 (e.g., by maneuvering a pointer or cursor over one of the identifiers and depressing a button of a cursor control device (e.g., clicking on a mouse button)). Selection of one of the identifiers in portion 140 causes access viewer 130 of FIG. 2 to load the corresponding file in viewing portion 142.

In the illustrated example of FIG. 3, reference page 128 is displayed as a "framed" page, in which each of the portions 140 and 142 comprises a separate frame. Alternatively, reference page 128 may also be displayed in a non-framed manner. For example, the file identifiers 140 could be displayed in a browser window and replaced, in response to selection of one of the file identifiers, by the content of the file corresponding to the selected identifier.

Figure 4:
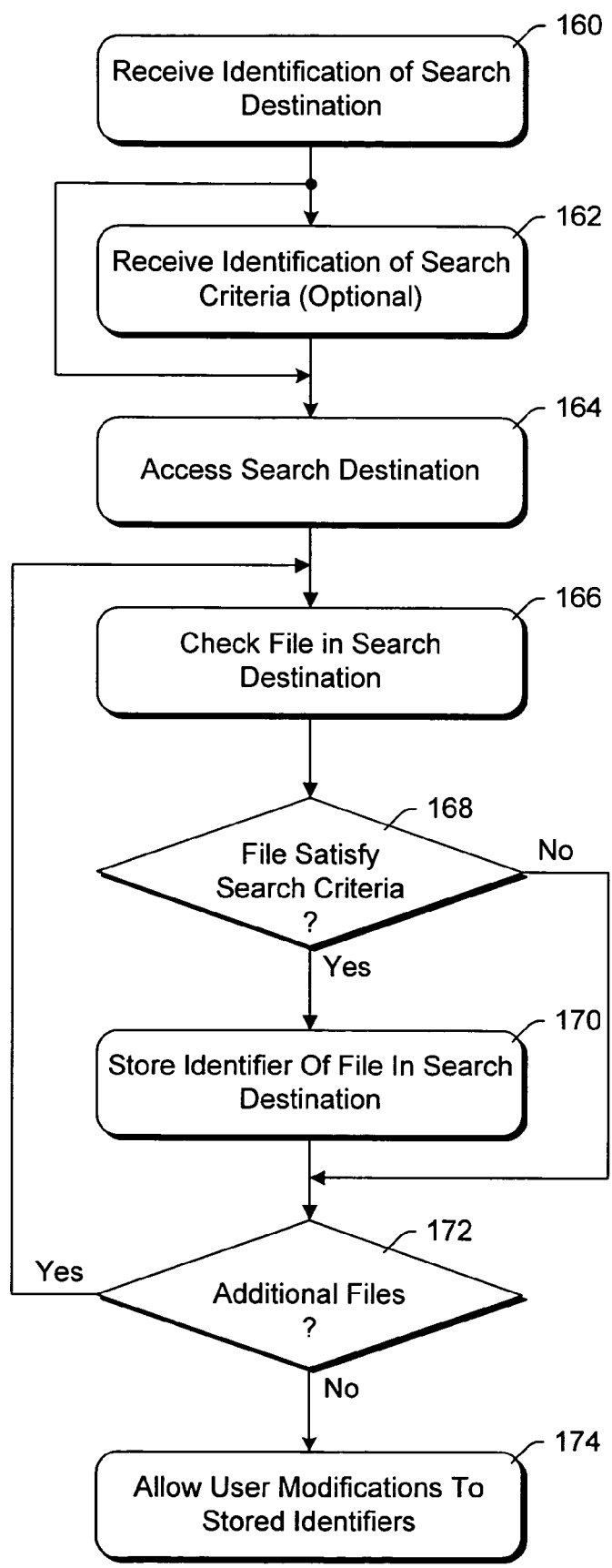
FIG. 4 is a flowchart illustrating an exemplary process for searching for files in accordance with certain embodiments of the invention.

FIG. 4 is a flowchart illustrating an exemplary process for searching for files in accordance with certain embodiments of the invention. In the illustrated example, the process is implemented by search controller 120 of FIG. 2, and may be implemented in software. FIG. 4 is discussed with additional reference to FIG. 2.

Initially, search controller 120 receives an identification of one or more search destinations (act 160), and optionally receives an identification of search criteria (act 162). The search destination is then accessed (act 164) and a file from the destination is checked to determine whether it satisfies the search criteria (acts 166 and 168). If the file satisfies the search criteria, then an identifier of the file is stored in a reference page (act 170), and another file is checked if there are additional files (act 172). If the file does not satisfy the search criteria, then an identifier of the file is not stored in the reference page and another file (if any) is checked, act 172. If no search criteria are provided, then all files at the destination are included in the reference page.

Once the file identifiers are added to the reference page, the user is allowed to make modifications to the identifiers (act 174). This modification process may occur after all files have been identified (as illustrated) or alternatively during the identification process (e.g., between acts 170 and 172).

Figure 5:
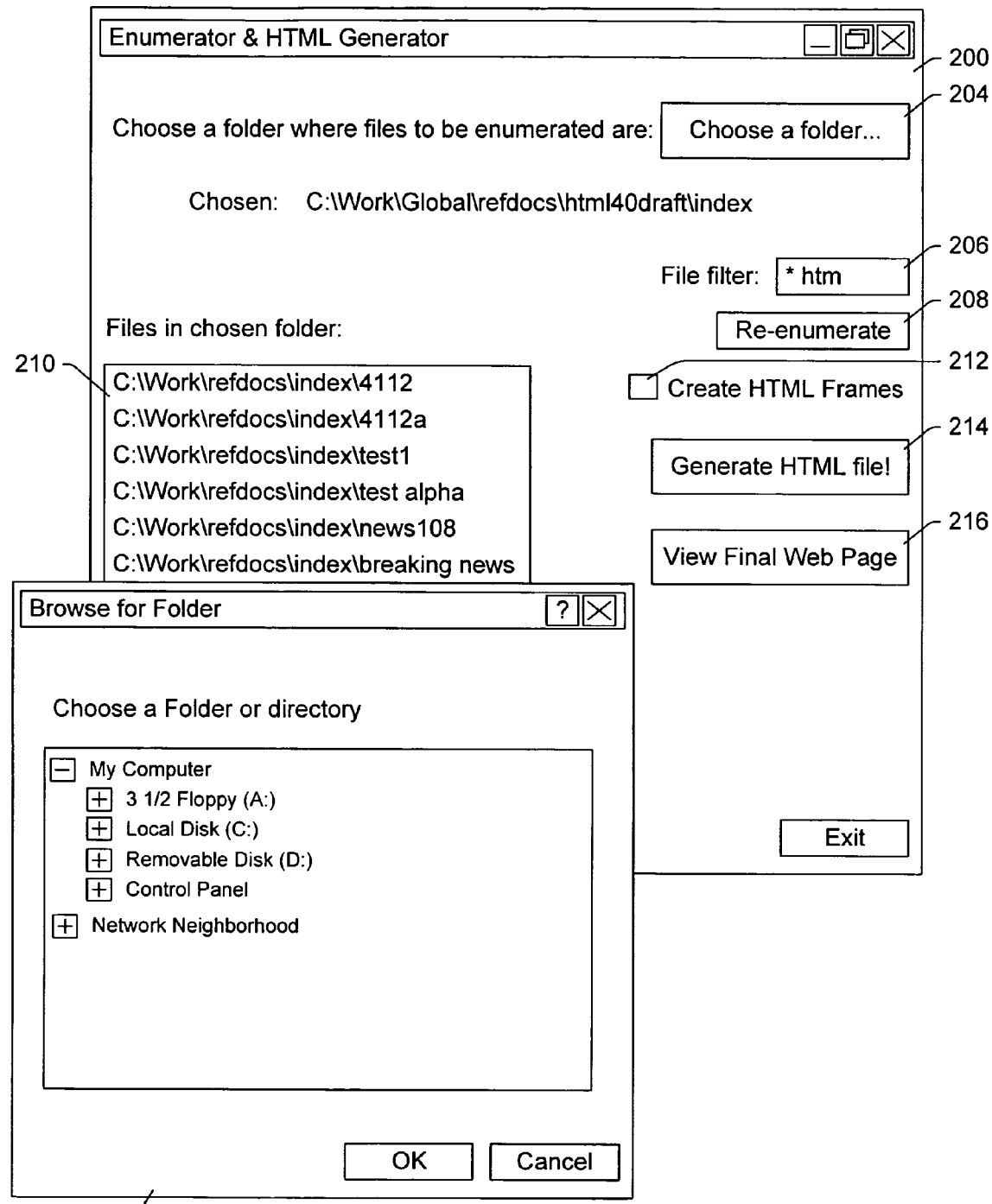
FIG. 5 illustrates an exemplary user interface for searching destinations in accordance with certain embodiments of the invention.

FIG. 5 illustrates an exemplary user interface for searching destinations in accordance with certain embodiments of the invention. The user interface of FIG. 5 is generated by search controller 120 of FIG. 2. A first window 200 titled "Enumerator & HTML Generator" and a second "Browse for Folder" window 202 are illustrated. Upon invoking the search function, the enumerator and generator window 200 is displayed to the user. Window 200 includes a "Choose a folder" button 204, selection of which causes browse window 202 to be displayed. Browse window 202 allows a user to browse through a computer (and/or network) to locate a destination to be searched.

Window 200 also allows the user to input search criteria in file filter field 206 and initiate a search by actuating re-enumerate button 208. After a search is initiated, search controller 120 of FIG. 2 displays, in file field 210, the files in the destination that satisfy the search criteria.

A user is further able to identify whether a framed reference page 128 is to be generated by selecting checkbox 212. The reference page 128 can be generated by the user actuating generate file button 214, and the reference page 128 viewed (by invoking viewer 130 of FIG. 2), by selecting view page button 216.

The specific manner in which files are automatically searched and displayed to users can vary (e.g., due to the design environment (e.g., type of machine, type of network, type of operating system, etc.), designer's preferences, etc.). Table I below identifies exemplary functions that can be used to automatically search for files and display results in one implementation.

TABLE I

| Function | Description |
| --- | --- |
| SHGetSpecialFolderLocation( ) | Retrieves a list of drives available on the user's computer. |
| SHBrowseForFolder( ) | Allows a user to choose any folder or any drive accessible via the computer. |
| SHGetPathFromIDList( ) | Retrieves file names from the location (e.g., folder) selected by the user. |
| CFileFind::FindFile( ) CFileFind::FindNextFile( ) | Together enumerate files from the retrieved location that satisfy given search criteria. |
| CListBox::AddString( ) | Populates the list box with names of found files satisfying the search criteria. |
| CreateFile( ) WriteFile( ) | Used to generate a new file for the reference page including the found files satisfying the search criteria. |

The automatic file searching and generating of a reference page provides numerous benefits. By way of example, the testing of applications that access the web (e.g., web browsers) can be simplified by automatically generating a reference page that includes URLs of (links to) each of the test files. The reference page can be augmented by the user adding parameters to the file identifiers.

Figure 6:
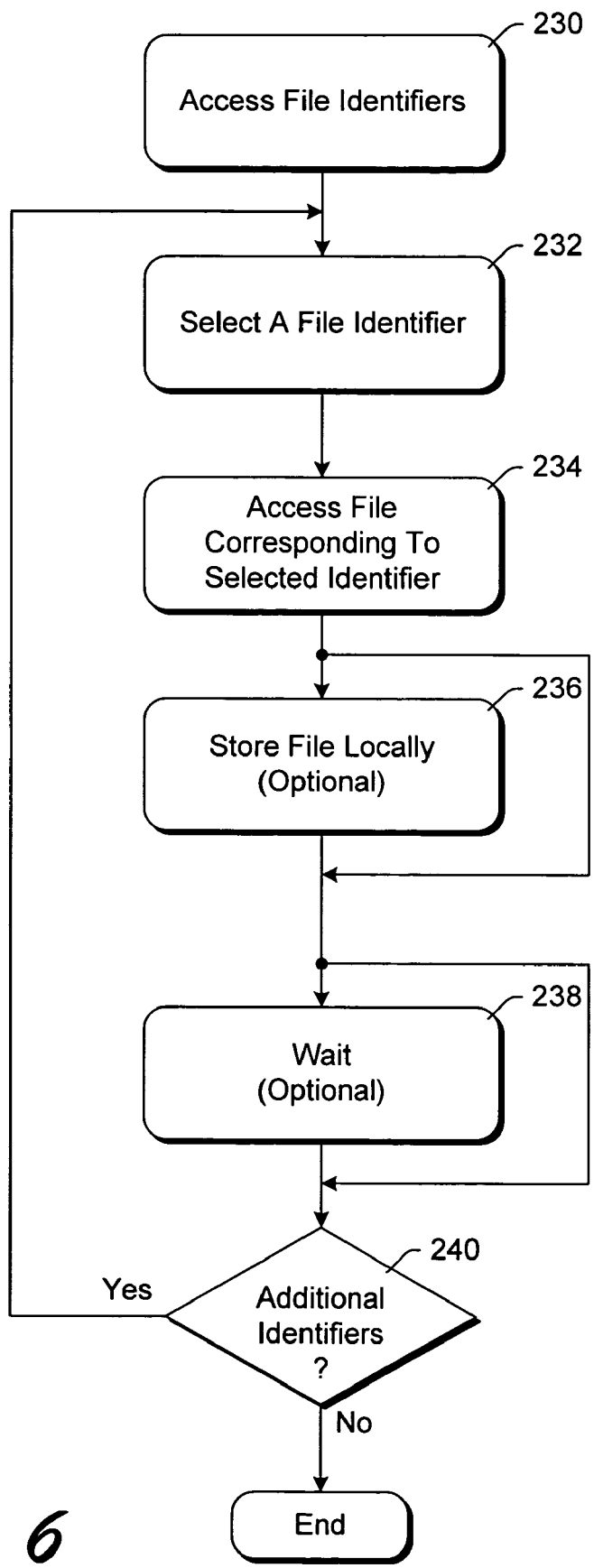
FIG. 6 is a flowchart illustrating an exemplary process for automatically accessing files in accordance with certain embodiments of the invention.

FIG. 6 is a flowchart illustrating an exemplary process for automatically accessing files in accordance with certain embodiments of the invention. In the illustrated example, the process is implemented by access controller 122 of FIG. 2, and may be implemented in software. FIG. 6 is discussed with additional reference to FIG. 2.

Initially, the file identifiers corresponding to the files to be accessed are accessed (act 230). As discussed above, these may be received from a reference page 128 and/or elsewhere. The reference page (or other source) is then parsed as necessary to identify the individual file identifiers (e.g., identifying one by one from a reference page), and one of the file identifiers is selected (act 232). The file corresponding to the selected identifier is then accessed (act 234). The selected file can be accessed in different manners. By way of example, the file can be loaded into a web browser and displayed to the user. By way of another example, the contents of the file may be copied to the client computer that includes access controller 122 for local storage.

The file is then optionally stored locally (act 236). Whether the file is to be stored, viewed, or other action(s) taken can be a user-configurable option. By way of example, a drop-down menu or dialog box may be displayed to the user giving him or her the option as to what actions should be taken when automatically accessing the files.

After the file is accessed, access controller 122 optionally waits for an amount of time (act 238). This amount of time may also be user-configurable. By waiting for a period of time, access controller 122 causes a pause between accessed files (e.g., a pause between displaying web pages to allow the user a chance to view each web page).

Access controller 122 then checks whether there are additional files to be accessed (act 240). If there are additional files to be accessed, then the process returns to select another file identifier (act 232); otherwise, the process ends.

The files can be accessed in any of a variety of orders. For example, the file identifiers accessed in act 230 may be chosen from randomly, in accordance with a pre-determined order (e.g., the order in which they exist in reference page 128), or some other order.

Figure 7:
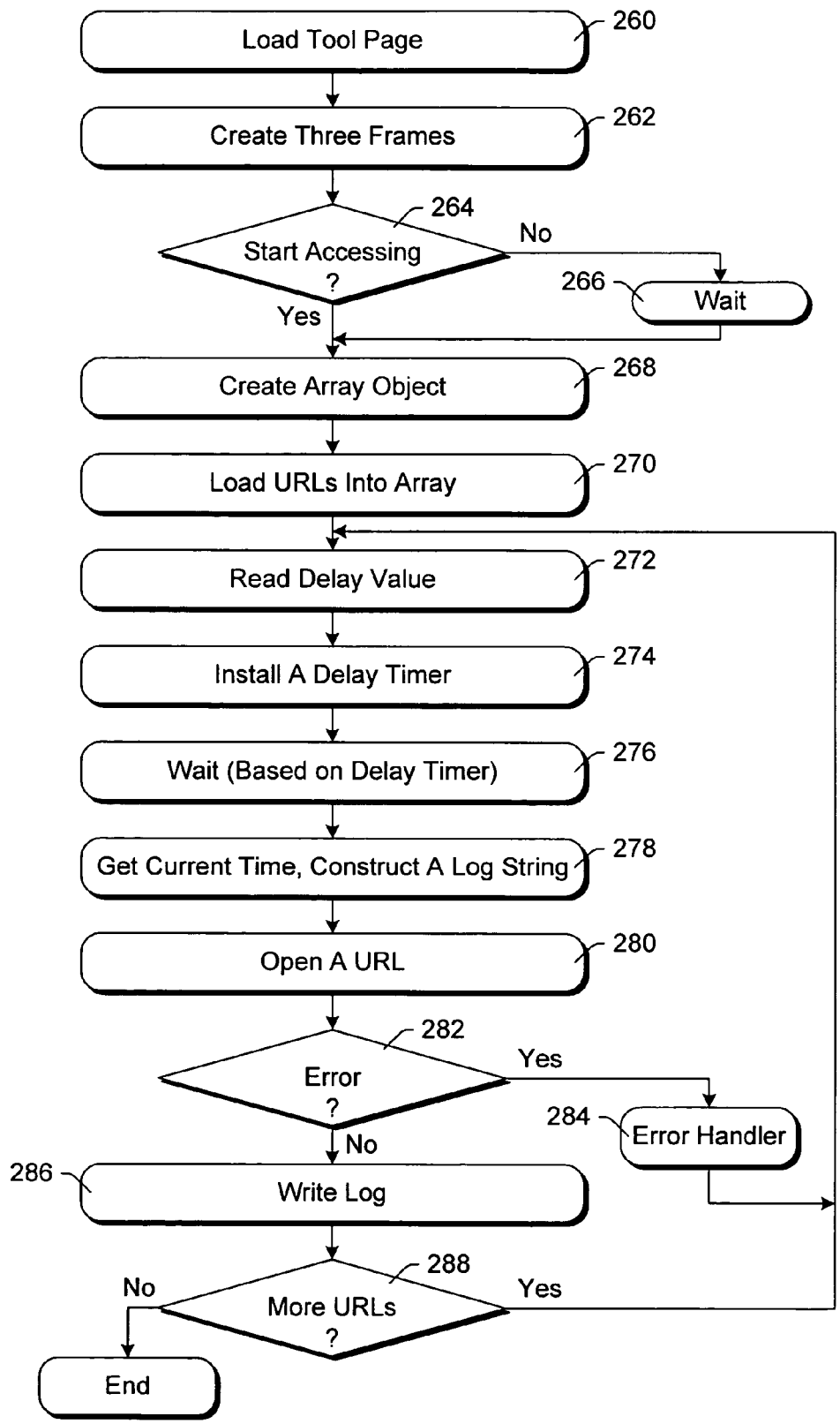
FIG. 7 is a flowchart illustrating a more detailed exemplary process for automatically accessing files in accordance with certain embodiments of the invention.

FIG. 7 is a flowchart illustrating a more detailed exemplary process for automatically accessing files in accordance with certain embodiments of the invention. In the illustrated example, the process is implemented by a client computer 104 of FIG. 1, and may be implemented in software. FIG. 7 is discussed with additional reference to FIG. 2.

Initially, a tool web page is loaded (act 260). The tool web page includes software instructions (e.g., in the form of a script) that perform the automatic accessing (e.g., the functionality of access controller 122 of FIG. 2). The tool page creates three frames (act 262) to be used during the automatic access processing: a first frame to allow user control, a second frame to display the log of accessed URLS, and a third frame to display the content of the files identified by the URLs.

The tool web page then checks whether the accessing is to begin (act 264), such as in response to user-selection of a "start" button. If not, then the tool page waits until the accessing is to begin (act 266). Once the accessing is to begin, the tool page creates an array object (act 268), such as a linked list or other data structure, and loads the URLs to be accessed (e.g., from reference page 128) into the array (act 270). The tool page then reads a delay value (act 272), such as may be set by the user, and installs a delay timer based on the delay value (act 274).

The tool page then waits for the delay timer to expire (act 276). Once the delay timer expires, the tool page determines the current time and constructs a log string (act 278). The log string identifies the URL being opened, the time the URL is opened, and how many URLs have already been opened. An URL from the array (e.g., the first URL in the array on the first pass through steps 272-280) is then opened (act 280). A check is then made as to whether an error occurred in opening the URL (act 282). If there was an error, then an error handler is invoked (act 284) to perform any of a wide variety of error handling functions (e.g., log the error, notify the user or an administrator, sound an alarm, etc.).

However, if no error occurred, then the log string created in act 278 is written to the log (act 286). The process then returns to act 272 if there are additional URLs (act 288), and ends if there are not additional URLs.

Figure 8:
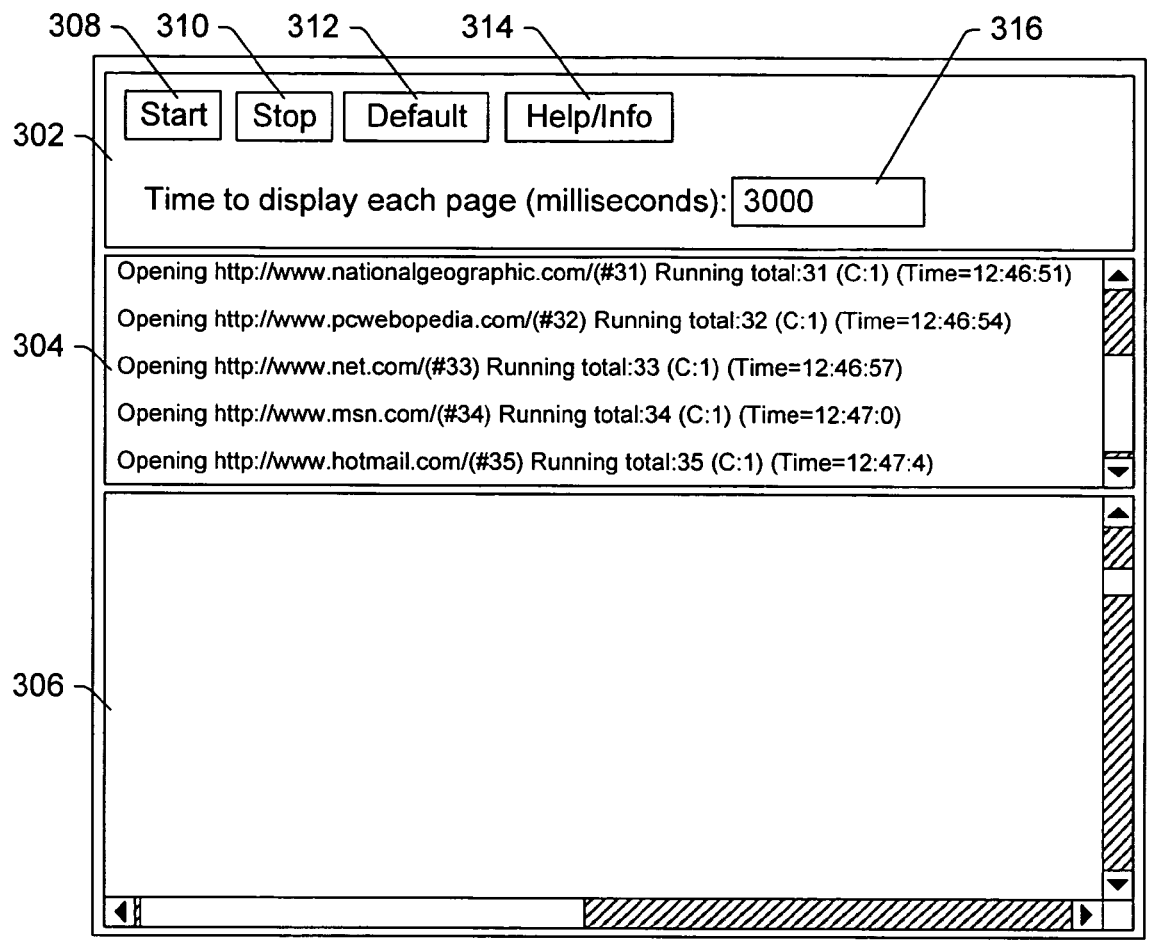
FIG. 8 illustrates an exemplary user interface displayed by the tool page in conjunction with the process of FIG. 7.

FIG. 8 illustrates an exemplary user interface displayed by the tool page in conjunction with the process of FIG. 7. The interface 300 includes three different portions or frames: control frame 302, log frame 304, and content display frame 306. Control frame 302 includes start and stop buttons 308 and 310 that allow the user to start and stop the automatic accessing process. A default button 312 allows the user to re-instate default values (e.g., for the delay value), and a help/info button 314 allows the user to view help information regarding use of the tool page. A delay field 316 allows the user to input a delay value to be used to indicate how long pages should be displayed before the next page is displayed.

Log frame 304 is a display of the log strings that are written to the log in act 286. Log frame 304 allows the user to follow the automatic accessing process as it occurs.

The tool page displays the content of the opened URLs in content display frame 306. Content display frame 306 allows the user to view the content of the URLs that are opened.

The specific manner in which files are automatically accessed and the user interface displayed to users can vary (e.g., due to designer's preferences, the design environment (e.g., type of machine, type of network, type of operating system, etc.), etc.). In one implementation, the following methods are used. An array object is created using the JavaScript Array( ) method. The interpage delay value input by the user (in field 316) is retrieved using HTML Object model methods (e.g., "<formname>.<inputcontrol-ID>.value"). The current time is obtained using JavaScript Date object's methods and properties (e.g., getHours( ), getMinutes( ), and getSeconds( )). The date is formatted and written (along with the other log information) to log frame 304 using HTML Object model's document.write( ) method. HTML Object model's window.location attribute is set to the appropriate URL element (the URL to be loaded) in the array of URLs. A timer is installed using window.setTimeout( ) method to insure the proper interpage delay. The window.scrollBy( ) method is used to ensure that the latest log string is always in view in log frame 304.

The automatic file accessing provides numerous benefits. By way of example, the testing of applications that access the web (e.g., web browsers) can be simplified by automatically trying to load each web page that is identified on a reference page. Automating the test in such a manner reduces the time required on the part of a tester in manually accessing each page. By way of another example, a user may locally store the contents of each web page that is identified on a reference page. Such a user is then able to access the locally stored web pages at a later time (e.g., when his or her computer is not in communication with the Internet).

FIG. 9 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 9 shows a general example of a computer 342 that can be used in accordance with the invention. Computer 342 is shown as an example of a computer that can perform the functions of client computer 104 or server computer 102 of FIG. 1. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (US) interface, etc.). A monitor 384 or another type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 9. The logical connections depicted in FIG. 9 include a local area network (LAN) 392 and a wide area network (WAN) 394. Such networking environments are commonplace in offices, enterprise-wide computer networks, intranets, and the Internet. In certain embodiments of the invention, computer 342 executes an Internet Web browser program (which may optionally be integrated into the operating system 370) such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 typically includes at least some form of computer readable media. Computer readable media can be any available media that can be accessed by computer 342. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the computer storage media listed above should be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving an indication of a destination to be searched;
   receiving an indication of a set of search criteria; searching the destination to identify one or more files that satisfy the search criteria;
   generating a reference page including an identifier portion, a viewing portion, and a log portion, wherein the identifier portion includes a plurality of file indicators, each corresponding to each of the one or more identified files, said each of the one or more identified files located at a remote location, wherein the plurality of file indicators are displayed on the reference page as user-selectable links to each of the corresponding one or more identified files, and wherein selection of one of the plurality of file indicators causes:
      a corresponding file of the one or more identified files to be displayed in the viewing portion of the reference page; and
      a record of the corresponding file to be displayed in the log portion of the reference page, wherein the record includes an indication that the file has been opened and a time that the file was opened;
   allowing modifications by a user to one or more of the plurality of file indicators in the reference page; and
   for each of the plurality of file indicators, obtaining the corresponding file from the remote location and storing the file locally.

2. The method as recited in claim 1, wherein each of the plurality of file indicators comprises a URL.

3. The method as recited in claim 1, wherein each of the one or more identified files comprises a web page.

4. The method as recited in claim 1, wherein different file indicators of the plurality of file indicators correspond to different files of the one or more identified files and are located at different remote locations.

5. One or more computer storage media having stored thereon a plurality of instructions that, when executed by one or more processors, causes the one or more processors to perform acts including:
   creating an array object;
   loading a plurality of uniform resource locators (URLs) into the array object;
   identifying a delay value;
   opening one of the URLs;
   storing, in a log, an indication that the opened URL has been opened and a time that the URL was opened;
   displaying content associated with the opened URL and the indication that the opened URL has been opened;
   waiting until an amount of time corresponding to the delay value has lapsed;
   repeating the opening, storing, displaying, and waiting for another URL in the array object; and
   continuing the repeating until all of the URLs in the array object have been opened.

6. The one or more computer storage media as recited in claim 5, wherein the plurality of instructions further cause the one or more processors to perform acts including:
   initializing a delay timer with the delay value; and
   wherein the waiting comprises waiting for the delay timer to expire.

7. The one or more computer storage media as recited in claim 5, wherein the storing comprises storing, in the log, both the indication that the URL has been opened and a number of URLs that have been opened.

8. The one or more computer storage media as recited in claim 5, wherein the plurality of instructions further cause the one or more processors to perform acts including obtaining the plurality of URLs by:
    receiving an indication of a destination to be searched;
    receiving an indication of a set of search criteria;
    searching the destination to identify one or more files that satisfy the search criteria; and
    generating the reference page including an URL for each of the one or more identified files.

* * * * *